United States Patent
Peng et al.

(10) Patent No.: US 7,258,476 B2
(45) Date of Patent: Aug. 21, 2007

(54) SHAPED OPTICAL FIBER LIGHT AND MANUFACTURING METHOD THEREOF

(75) Inventors: Chi-Tsung Peng, Hsinchu (TW); Chiu-Hsiung Lee, Hsinchu (TW)

(73) Assignee: Baycom Opto-Electronics Technology, Co. Ltd., Hsinchu (TW)

( * ) Notice: Subject to any disclaimer, the term of this patent is extended or adjusted under 35 U.S.C. 154(b) by 119 days.

(21) Appl. No.: 11/053,232

(22) Filed: Feb. 9, 2005

(65) Prior Publication Data

US 2006/0109679 A1    May 25, 2006

(30) Foreign Application Priority Data

Nov. 25, 2004  (TW) ............................... 93136342 A

(51) Int. Cl.
*A47G 35/00* (2006.01)
(52) U.S. Cl. ........................ 362/565; 362/555; 362/121
(58) Field of Classification Search ................ 362/555, 362/565–566, 806, 121
See application file for complete search history.

(56) References Cited

U.S. PATENT DOCUMENTS

| 4,274,127 A | * | 6/1981 | Beck et al. | 362/511 |
| 4,529,193 A | * | 7/1985 | Kuhnsman | 482/1 |
| 6,955,441 B1 | * | 10/2005 | Chen | 362/96 |
| 7,020,369 B2 | * | 3/2006 | Lodge et al. | 385/100 |
| 2002/0176260 A1 | * | 11/2002 | Liao | 362/551 |

* cited by examiner

*Primary Examiner*—Ali Alavi
(74) *Attorney, Agent, or Firm*—Lowe Hauptman & Berner, LLP

(57) ABSTRACT

A shaped optical fiber light and the manufacturing method thereof are described. The shaped optical fiber light has a shaped protection tube, at least one optical fiber, and a light source. The shaped protection tube is shaped into a predetermined shape and the optical fibers are configured therein. The light source couples to one end or two ends of the optical fibers to form a shaped light tube. The light source is preferably a light source composed of at least one light emitting diode. The optical fiber is preferably an optical fiber with lateral light leakage so as to form a linear lighting pattern with the optical fiber and the shaped protection tube. In addition, the manufacturing method of the shaped optical fiber light is also disclosed.

18 Claims, 2 Drawing Sheets

SHAPED OPTICAL FIBER LIGHT AND MANUFACTURING METHOD THEREOF

RELATED APPLICATIONS

The present application is based on, and claims priority from, Taiwan Application Serial Number 93136342, filed Nov. 25, 2004, the disclosure of which is hereby incorporated by reference herein in its entirety.

BACKGROUND OF THE INVENTION

1. Field of Invention

The invention relates to a shaped light and the method of making the same. In particular, the invention relates to a shaped fiber light and the manufacturing method thereof.

2. Related Art

Neon light has been widely used all over the world as a tool for advertisements. The neon light has many different colors and shapes for different users. Therefore, they help attracting pedestrians and providing merchants more business opportunities.

The neon light is made of sodium glass or lead glass. Since its introduction in the 1920s, the neon light is widely used for outdoor advertisements and indoor decorations. Its variety in shapes and colors draw people's attention.

To make the neon light, one usually first fills the glass tube with color powders, followed by machining and shaping the tube and the tube connector. It is then heated and vacuumed. Afterwards, it is filled with a gas such as neon or argon. In the end, the light tube is tested. The neon light uses the electrodes therein and a transformer to raise the voltage from 220 V to 15000 V, ionizing the gas in the glass tube. Light of different colors is emitted along the pattern of the tube and according to the gas therein. The light tube made via a complicated procedure and using the glass increases the cost of manufacturing and maintenance. In particular, the high power consumption of the neon light also increases the usage cost.

Other traditional shaped light products, decorations, or toys are mostly made of shaped plastic or metal attached with conventional light bulbs or by installing light emitting diodes (LED) in a flexible material of heat-melting adhesive. However, the radiation from point sources does not provide a good overall presentation. Although the neon light can provide a good overall pattern, it nevertheless has the disadvantages of a complicated manufacturing process, large power consumption, a higher cost, a shorter lifetime, and difficult maintenance. Moreover, since glass does not have a protective power, it further suffers from the problems of being fragile, defective, and gas leaking.

Therefore, how to provide a shaped tube with the same colored feature as the neon light but lower power consumption is an important issue in the field.

SUMMARY OF THE INVENTION

As described above, in spite of the attractive features and shapes of the neon light, its complicated manufacturing process, higher cost, and larger power consumption are the disadvantages. Therefore, how to reduce the production cost of the shaped light and power consumption, while at the same time increasing the safety of the shaped light are very crucial in providing wider applications for the shaped light.

An objective of the invention is to provide a shaped light that has a lower manufacturing cost. It is covered by a transparent shaped protection tube, which makes the shaping of easier.

Another objective of the invention is to provide a shaped light made of a non-fragile material. Not only is it free from being broken, it also involves a simpler production procedure.

Another objective of the invention is to provide a shaped light which uses a fiber with lateral light leakage so as to form a linear lighting pattern from the light source of the LED. This can save power and elongate the lifetime.

According to the above objectives, an embodiment of the invention is a shaped optical fiber light. The shaped optical fiber light contains a shaped protection tube, at least one optical fiber, and a light source. The shaped protection tube is shaped into a predetermined shape and the optical fibers are configured therein. The light source couples to one end so that the light can be emitted along the predetermined shape of the shaped protection tube. The light source of the shaped optical fiber light is further coupled to a power supply, such as a battery or a power outlet, to provide the energy needed for the radiation.

The above-mentioned light source can be comprised of LED. The light source is further coupled to a control device to switch on or off the light source. Thus, the shaped optical fiber light has the abilities to flash and change colors. The other end of the fiber can also be coupled to a light source. Both light sources can be turned on at the same time or alternately. The light source on the other end can be comprised of LED too. The optical fiber has lateral light leakage. The shaped protection tube is a transparent shaped protection tube, which may have a predetermined color or many colors.

Another embodiment of the invention provides a method of manufacturing the shaped optical fiber light. The method includes the steps of: providing at least one optical fiber in a transparent protection tube; heating the transparent protection tube and the optical fibers therein to shape the transparent protection tube in a shape mold, forming a shaped tube; assembling the shaped tube, at least one light source, and a power supply to form a shaped optical fiber light. In particular, the transparent protection tube is preferably heated using a hot air.

The above-mentioned power supply is a battery or a power outlet. The light source contains at least one light emitting diode (LED). A control device is used to switch on and off the light source. The optical fiber is preferably one with lateral light leakage. The transparent protection tube may be a transparent shaped protection tube with one predetermined color or many colors.

The disclosed shaped optical fiber light and the manufacturing method thereof make the production of business or decorative shaped light much easier and sturdier. The reduction of the fragile material such as glass effectively reduces the production and maintenance costs. Using optical fibers with lateral light leakage, one only needs to provide light sources on one or both ends of the optical fibers. The optical fibers further produce linear patterns and a three-dimensional effect.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

The disclosed shaped light can be easily made and installed. It also provides different shapes of linear light-emitting patterns according to user's needs. Moreover, the invention can effectively reduce the power consumption and increase the lifetime of the shaped light.

Figure 1:
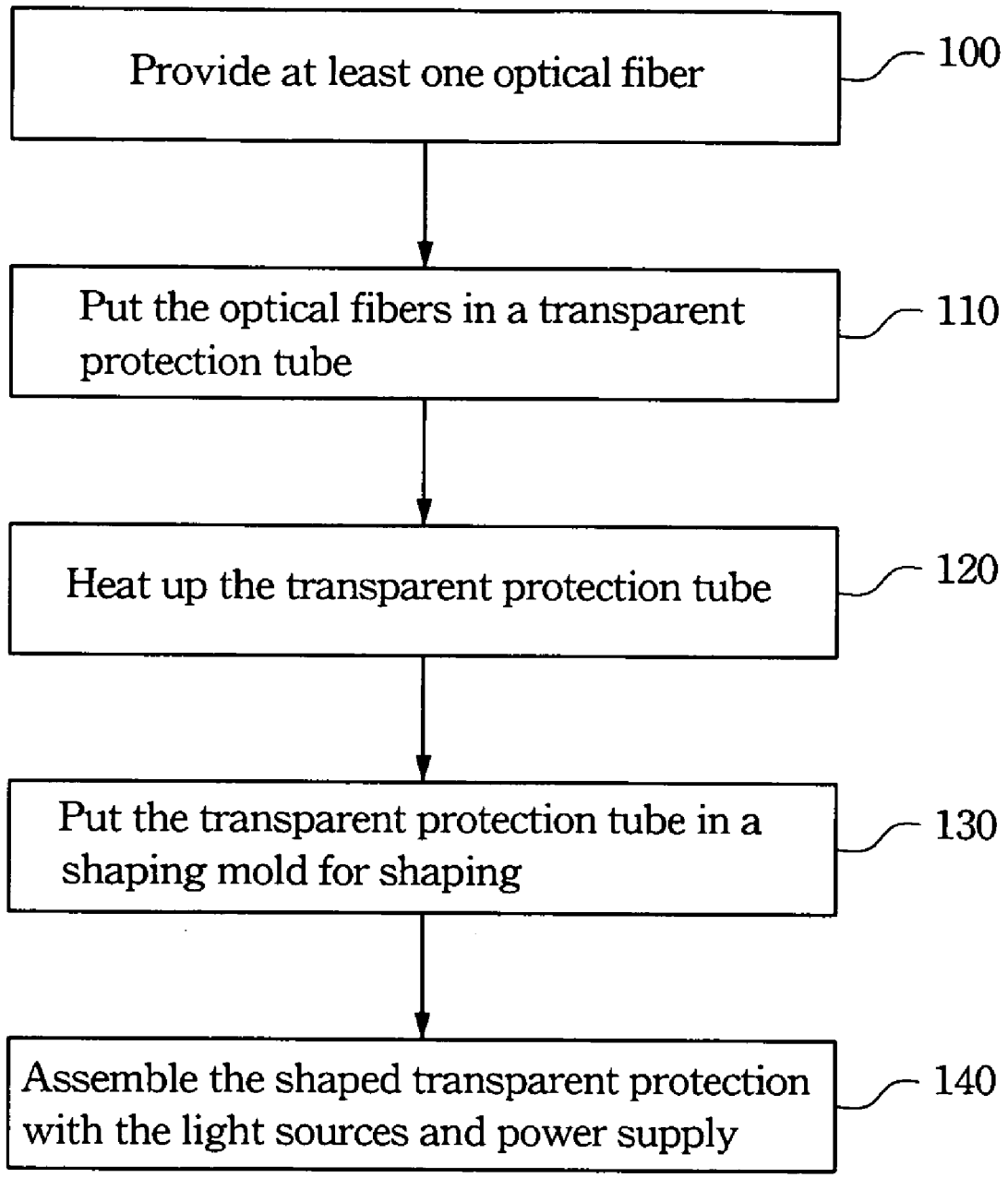
FIG. 1 is a schematic view of the manufacturing procedure for the disclosed shaped light.

As shown in FIG. 1, at least one optical fiber is provided to form the disclosed shaped light in step 100. The optical fiber is preferably one with lateral light leakage. In step 110, the optical fibers are put into a transparent protection tube. The transparent protection tube is heated for shaping in step 120. In step 130, the heated transparent protection tube and the optical fibers therein are put into a shaping mold, forming the transparent protection tube into a predetermined shaped tube. In step 140, the shaped tube (i.e. the shaped transparent protection tube and optical fibers) is coupled with a light source and a power supply to form a shaped light.

The transparent protection tube may be a transparent or a half-transparent protection tube. Moreover, it may have a particular color or many colors. Its material may be a heat-molding plastic such as polyvinyl chloride (PVC), polypropylene (PP), polystyrene (PS), or polycarbonate (PC). All of them can effectively provide the functions of shaping and protecting the optical fibers therein. The heating of the transparent protection tube is preferably done using hot air. The molding process in the shaping mold can be done at the same time.

Figure 2:
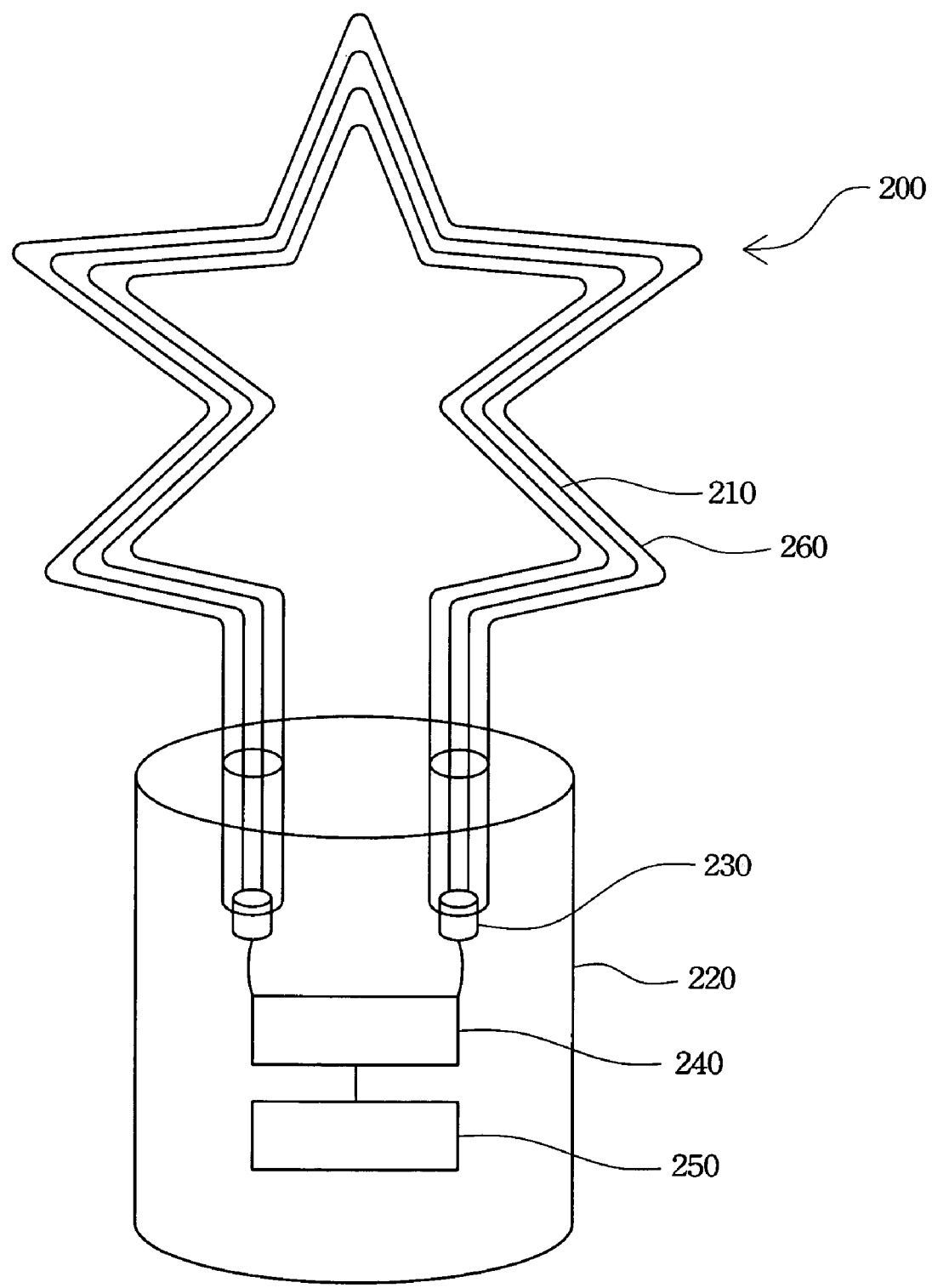
FIG. 2 is schematic view of a preferred embodiment of the disclosed shaped light.

To describe the explicit features of the disclosed shaped light, we refer to FIG. 2. As shown in the drawing, the shaped light has a shape tube 200 and a base 220. The shaped tube 200 has a star profile, which is preferably formed using the manufacturing process illustrate in FIG. 1. The shaped tube 200 further contains at least one optical fiber 210 and a shaped protection tube 260. After the shaped tube 200 is formed, it is combined with the base 220, forming the disclosed shaped light.

One or both ends of the optical fibers 210 are coupled to at least one light source 230. The light source 230 can be a monochromatic light source or a color light source. The light source 230 preferably consists of light emitting diodes (LED). Since the LED can provide the light required by the linear shaped tube 200 at a more stable and power-efficient mode than conventional neon light or light bulbs, the disclosed shaped light thus has a lower production cost and power consumption.

The optical fiber 210 preferably has lateral light leakage. When light emitted from the light source 230 is guided from at least one end of the optical fiber to the core of the optical fiber, it is transmitted along the core as well as scattered sideways. Therefore, a continuous linear light-emitting pattern is formed along the shaped tube 200. The disclosed shaped light can produce the continuous light pattern that traditional neon light provides. The use of the LED can largely reduce the required energy than the prior art. Moreover, the use of the optical fibers 210 can readily light up a long-distance linear pattern.

The disclosed shaped light also contains a power supply 250, such as a battery or a power outlet, to provide the energy needed by the light source 230. The shaped light of the invention may also contain a control device 240 coupled between the power supply 250 and the light source 230 to control the flashing or color switching of the light source 230. The shaped light can thus provide more varieties of light-emitting modes.

The shaped light of the invention makes use of optical fibers with lateral light leakage and a shaped protection tube to provide a longer light-transmitting distance. It avoids the use of light bulbs, lamps or any other high-cost elements. Since it reduces the use of fragile materials such as glass, it effectively reduces the production and maintenance costs. The disclosed shaped light has both light-guiding and lateral light leakage properties. Therefore, one only needs to provide light sources on one or both ends of the optical fibers to achieve the light-emitting effect. When the light source is damaged, the user can replace it easily without changing the whole set. Thus, the invention achieves the goals of easy maintenance and lower costs. The light guiding property of the optical fibers makes the manufacturing process simpler, thereby reducing the production cost.

The light source is preferably composed of LED, which provide sufficient illuminating brightness. The LED replace the light bulbs or neon light to reduce the production and installation costs. It also reduces the power consumption. The optical fibers here provide linear light-emitting patterns, which are different from the point-like light emission as in conventional LED or light bulbs. Thus, the overall pattern achieves a three-dimensional light-emitting effect.

The size, shape and number of elements in the drawings are only for illustration purposes and should not be used to restrict the scope of the invention. Any person skilled in the art can modify these properties according to the needs without departing from the spirit of the invention.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A shaped optical fiber light, comprising:
   a shaped protection tube with a fixed shape;
   at least one optical fiber installed inside the shaped protection tube, wherein the optical fiber is a lateral light leakage optical fiber;
   a light source coupled to the optical fibers for the optical fiber to emit light along the fixed shape of the shaped protection tube; and
   another light source coupled to the other ends of the optical fibers.

2. The shaped optical fiber light of claim 1 further comprising a power supply coupled to the light source to provide the needed energy.

3. The shaped optical fiber light of claim 2, wherein the power supply is selected from a battery and a power outlet.

4. The shaped optical fiber light of claim 1, wherein the light source contains at least a light-emitting diode (LED) source.

5. The shaped optical fiber light of claim 4, wherein at least one LED source is coupled to a control device to control the switch of the LED source.

6. The shaped optical fiber light of claim 1, wherein the other light source contains at least a LED source.

7. The shaped optical fiber light of claim 1, wherein the shaped protection tube is a transparent shaped protection tube.

8. The shaped optical fiber light of claim 7, wherein the shaped protection tube is a transparent shaped protection tube with a predetermined color.

9. The shaped optical fiber light of claim 7, wherein the shaped protection tube is a transparent shaped protection tube with many colors.

10. A manufacturing method of a shaped optical fiber light, comprising the steps of:
- providing at least one optical fiber;
- putting the optical fibers into a transparent protection tube;
- heating up the transparent protection tube with the at least one optical fiber;
- shaping the transparent protection tube with the at least one optical fiber in a shaping mold to form a shaped tube with the at least one optical fiber;
- assembling a light source to one end of the optical fiber for the optical fiber to emit light along the shaped protection tube in a fixed shape; and
- assembling another light source coupled to the other end of the optical fiber.

11. The manufacturing method of claim 10 further comprising the steps of assembling the shaped tube with a power supply.

12. The manufacturing method of claim 11, wherein the power supply is selected from a battery and a power outlet.

13. The manufacturing method of claim 10, wherein the light source contains at least one LED source.

14. The manufacturing method of claim 10 further comprising the step of installing a control device to switch the light sources.

15. The manufacturing method of claim 10, wherein the optical fiber has lateral light leakage.

16. The manufacturing method of claim 10, wherein the transparent protection tube is a transparent shaped protection tube with a predetermined color.

17. The manufacturing method of claim 10, wherein the transparent protection tube is a transparent shaped protection tube with many colors.

18. The manufacturing method of claim 10, wherein the step of heating up the transparent protection tube employs hot air to soften the transparent protection tube.

* * * * *